June 10, 1930.  J. W. ADAMS  1,763,414
GATE
Filed Nov. 30, 1929
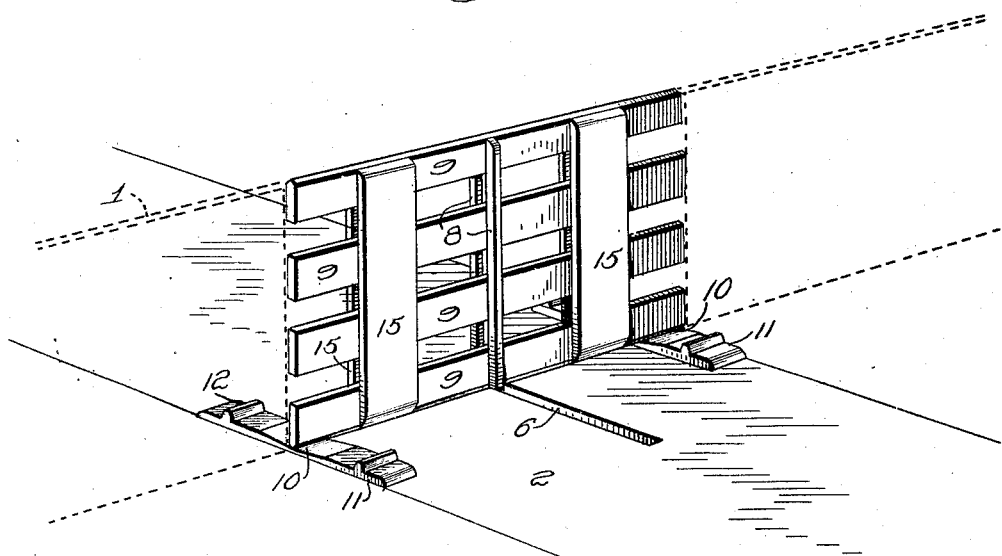
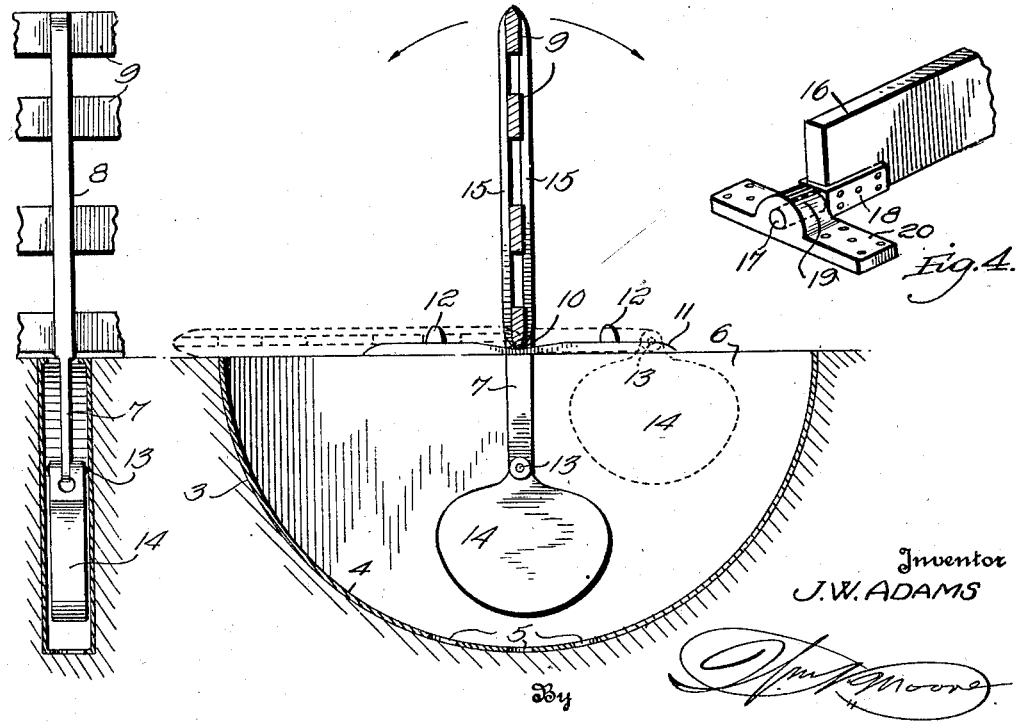
Inventor
J. W. ADAMS Patented June 10, 1930

1,763,414

UNITED STATES PATENT OFFICE

JOSEPH W. ADAMS, OF LEXINGTON, KENTUCKY

GATE

Application filed November 30, 1929. Serial No. 410,772.

My invention relates to improvements in gates, and one object of my invention is the provision of a gate which will assume a vertical or closed position under normal conditions, but which will upon the passage of a vehicle over the gate fall to horizontal position and immediately after the vehicle has passed over the gate it will instantly return to normal vertical closed position.

Another object of my invention is the provision of a gate which will prove highly desirable and useful as a railway gate, a gate to enclose a field, a farm gate, or in fact prove a desirable gate in any situation where a gate would be desired where its use would make it unnecessary for the occupant of the automobile or other vehicle to leave his seat to open or close the gate.

Another object of my invention is the production of a gate which will open or close from either side by the passage of an automobile or vehicle over it and remain absolutely closed under normal conditions and which will be simple, strong and durable in construction and which can be manufactured at small cost to assure an efficient and practical gate.

To attain the desired objects my invention consists of a gate of the character described embodying novel features of construction and combination of parts, substantially as described and claimed and as shown in the accompanying drawing, in which:

Figure 1 represents a perspective view of a gate constructed in accordance with and embodying my invention and shown in closed position and in relation to the fence and roadway.

Figure 2 represents a central longitudinal sectional view of the complete invention, the gate being shown in full lines as closed and in dotted lines the position the gate occupies when lowered or open, and Figure 3 represents a transverse sectional view of the improvement.

Figure 4 represents a detail view of a modified form of hinge for the gate.

The gate may be used for any purpose where it would serve its functions in a practical manner and for purpose of illustration I have shown a fence or enclosure 1 and a roadway 2, in connection with which the invention is used.

In a trench or pit 3, of the roadway is placed the metal casing 4, which may be provided with openings 5, to drain off the accumulation of water which may enter through the passage or slot 6, in which is adapted to move the depending arm 7, forming a part of the vertical rails 8, which are secured to each side of the horizontal panels 9 of the gate, the lower panel resting in the recesses or notches 10, of the pair of supporting plates 11, which plates are also provided with flanges 12, which serve as stops or abutments when the gate is lowered, as shown in Figure 2, to prevent the gate from leaving its bearings 10.

The depending arm 7, has pivoted to its lower end 13, the counter weight 14, which when the vehicle or automobile has passed over the traction rails 15, on each side of the gate and is in the position shown in dotted lines in Figure 2, acts to immediately return the gate to closed position as shown in Figures 1 and 2.

From the foregoing description taken in connection with the drawings it will be noted that the gate is retained normally closed by the counter weight, and that when the wheels of the vehicle contact with the traction rails 15, the gate will be pushed down and the vehicle wheels will travel over the rails 15, until the gate is cleared, when the weight will instantly return the gate to vertical position.

The advantages of my gate will be instantly apparent and it will be noted that it is strong, durable and cheap, it will be opened from either side by the passage of the vehicle over the gate and make it unnecessary for the driver to leave the vehicle and will instantly close as soon as the vehicle has passed over, that the gate will prove efficient and practical in many places, and that from every point of view the gate will commend itself as filling a long felt want.

In Figures 4 is shown a modified form of hinge which is attached to each lower corner of the lower rail 16, and consists of the pintle 17, carried by the bracket 18, fastened to rail 16, and said pintle bears in the bearing 19, of the plate 20, which is fastened rigidly to the roadway base, and this provides a novel and practical form of hinge.

The roadway is preferably of cement, concrete, or other suitable material best suited material best suited for the purpose.

It will be noted in dotted lines in Figure 2, that the gate when lowered disposes one of the lugs between the lower and adjoining panels of the gate, and in this way provides a stop or abutment which prevents the gate from sliding as the vehicle passes over the traction sills of the gate, and this is a most important feature of my invention, as it insures a practical operation of the gate.

I claim:

1. A gate of the character described, comprising a casing adapted to be placed below the roadway, said casing having a slot in its upper portion, a pair of plates resting on said casing and formed with a gate bearing and a pair of stops, a gate having its lower rail bearing in said bearings of said plates, with one of said stops between the space in the lower panels of the gate to prevent sliding of said gate, an arm depending from said gate through the slot of the casing, a weight on said arm to cause the gate to assume a vertical position, and traction rails on each side of the gate for engagement with the wheels of a vehicle.

2. A gate of the character described, comprising a series of horizontal panels, properly spaced apart, broad vertical traction sills arranged on each side of said horizontal panels, a pair of vertical rails secured to each side of said horizontal panels and provided with a depending arm, a weight hung from said arm, a pair of plates arranged at each end of said gate and having a bearing to receive the lower edge of the lower panel of said gate and having at each side of said bearing a lug adapted when the gate is lowered to enter the space below the two lower panels of the gate to provide a stop to prevent sliding of the gate.

In testimony whereof I affix my signature.

JOSEPH W. ADAMS.